United States Patent [19]
Johnson

[11] 3,949,686
[45] Apr. 13, 1976

[54] GRAIN FIELD MARKER

[76] Inventor: LeRoy E. Johnson, P.O. Box 6, Stanley, N. Dak. 58784

[22] Filed: June 16, 1975

[21] Appl. No.: 586,853

Related U.S. Application Data

[63] Continuation of Ser. No. 339,353, March 8, 1973, abandoned.

[52] U.S. Cl. .................................. 111/1; 111/37
[51] Int. Cl.² ........................................ A01C 5/00
[58] Field of Search ......... 111/1, DIG. 1, 34, 36–37, 111/73, 81; 47/58

[56] References Cited
UNITED STATES PATENTS 2,736,991 3/1956 Schumacher et al. ................ 47/58
3,621,612 11/1971 Porter .................................... 47/58

*Primary Examiner*—Robert E. Bagwill
*Attorney, Agent, or Firm*—Merchant, Gould, Smith, Edell, Welter & Schmidt

[57] ABSTRACT

A grain drill having a plurality of closely spaced seeding units is modified to change the pattern of seed flow through one of the seeding units cyclically within the length of a row, so that when the plants emerge, the one row will be visibly different from the other rows. The visibly different row can then be used as a marker for weed control spraying or the like.

8 Claims, 10 Drawing Figures

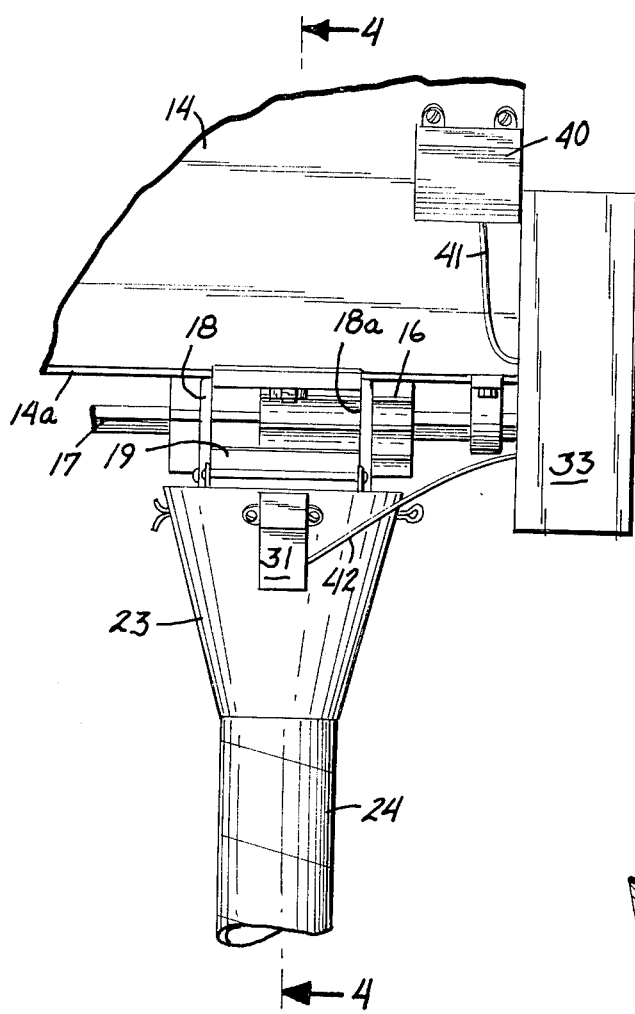
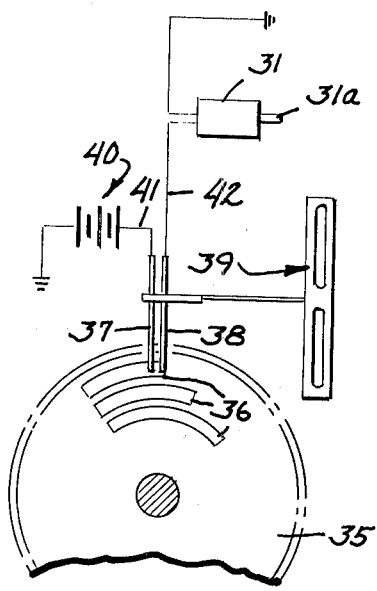
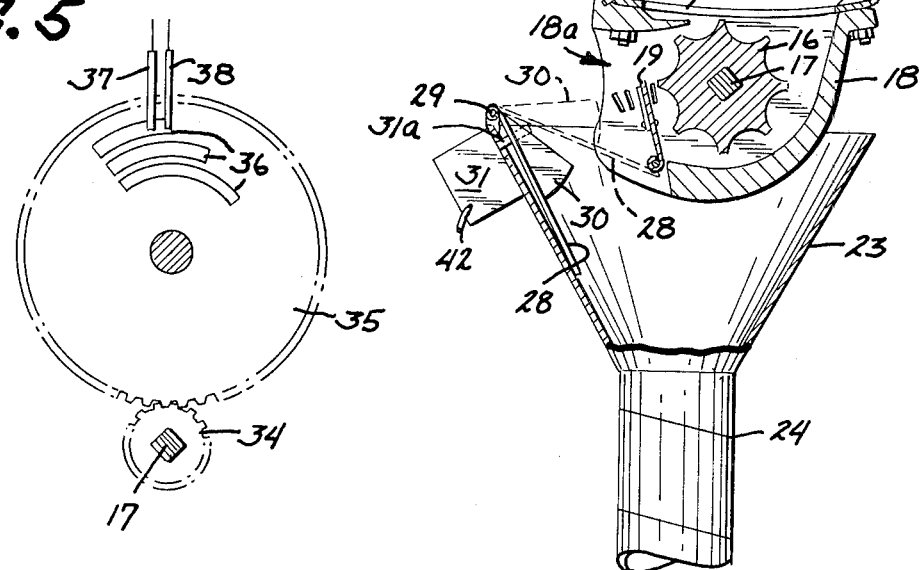
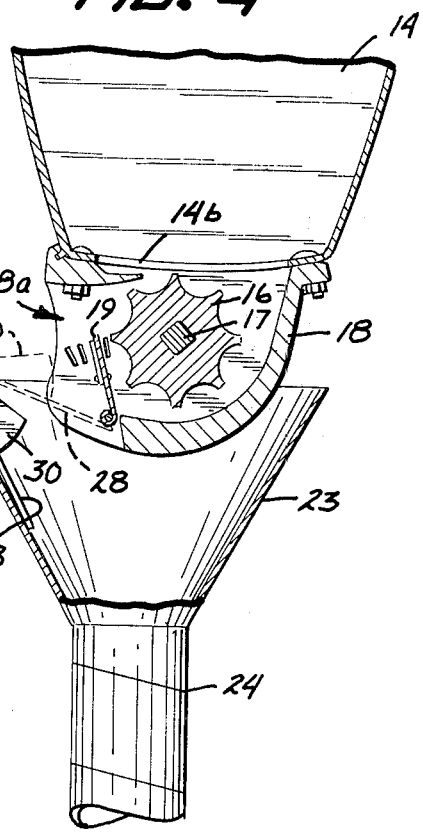

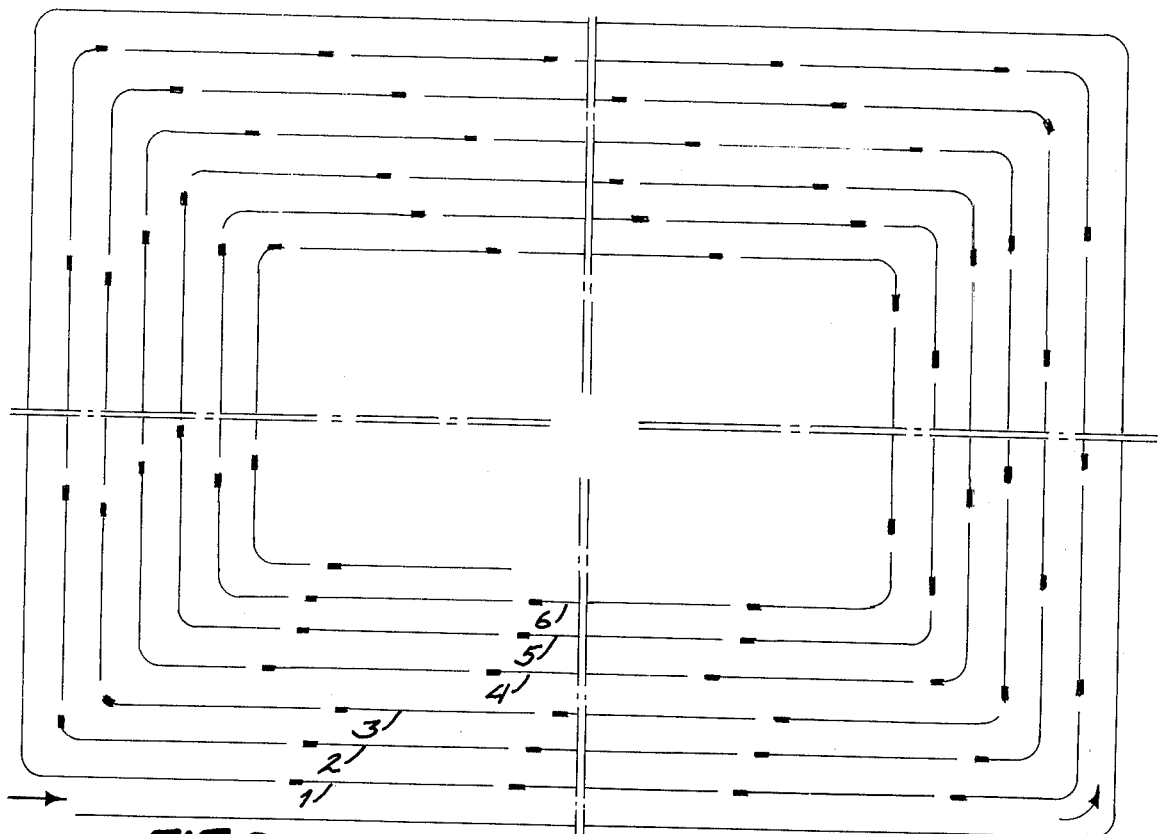
FIG. 9
FIG. 10
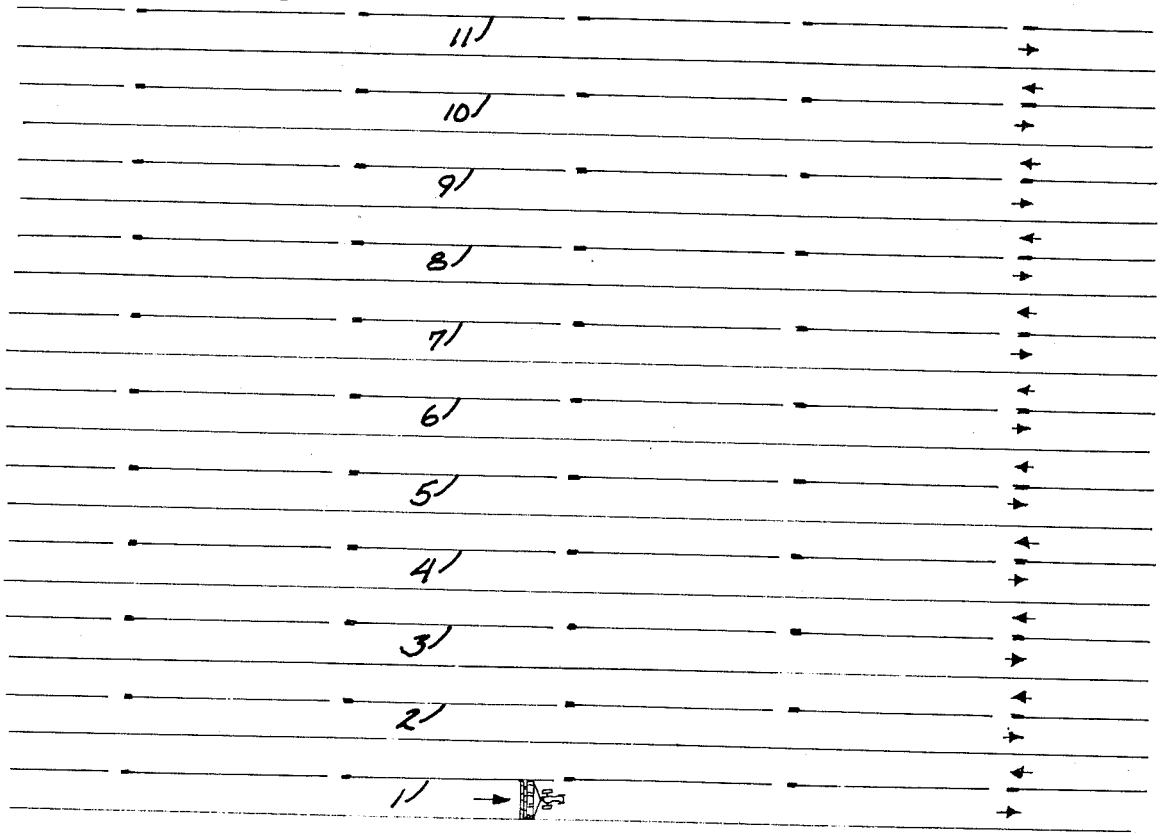

GRAIN FIELD MARKER

This is a continuation of application Ser. No. 339,353, filed Mar. 8, 1973 (now abandoned).

BACKGROUND OF THE INVENTION

1. Field of the Invention

This invention relates generally to agricultural field marking systems, and more particularly relates to apparatus and method for planting a grain field so that certain rows of plants will grow in a pattern different from the other rows and thereby act as markers for later operations such as weed control spraying.

2. Description of the Prior Art

Feed grain crops such as oats, barley and wheat are usually planted in closely spaced rows by means of a grain drill. It has become common practice to spray the field with herbicide for weed control after the plants have emerged. Either aircraft or ground spraying equipment can be used. In either case, it is very difficult to prevent skipping and overlapping from occurring. The skips permit weeds to develop and the overlaps cause grain damage.

To minimize these problems when using aircraft, it has been necessary to use flagmen at the ends of the field or to drop paper strips from the aircraft on successive passes. When ground-type spraying equipment is used, the operator must attempt to judge the correct distance from the previous wheel tracks in the grain. The ends of some sprayer booms have been provided with powder or flour markers, but these have not been satisfactory in operation and have been too expensive and troublesome. Flagmen have also been used with ground spraying equipment. In areas of the country where sprayer booms up to 200 feet wide have been used, it has sometimes been necessary to have a man ride a motorcycle down the field at the end of the boom. This causes additional injury to the plants and still leaves the operator of the ground equipment up to 100 feet from the mark. The extra man also considerably increases the expense of the operation. In general, there is no satisfactory or economical system or method of marking a field for spraying that is available at the present time.

SUMMARY OF THE INVENTION

I have devised an apparatus and a method for so performing the seeding operation itself that the growth pattern of the emerging plants constitutes, without more, a visually sufficient marking of the field for guiding the performance of later spraying operations, thus obviating the need for any fixed markers, flagmen, and so on at the time of the later operations. The recognizable pattern is, of course, in contrast to the general growth pattern in the field. It is also distinguishable from the distinctive growth patterns resulting from malfunctions of the seeder or slight imperfections in the seeding process such as inadvertent planting of the same row twice or leaving a row unplanted.

Broadly, my invention comprises modifying the operation of a selective one of the drills in a planter to cyclically change the seed flow as the seeder proceeds across the field, to produce a recognizable repeated nonuniformity in the deposition of seed along the length of the row. The modification can be a repeated increase in the feeding rate for predetermined intervals, or a repeated decrease in the feeding rate for predetermined intervals, or a combination of the two: it may also comprise the addition of a different seed intermittently at intervals. Any one of these modifications results in a growth pattern easily distinguishable from the normal growth in the field in general, and from the commonly encountered abnormal growth patterns, by its cyclic or repetitive character along the row. In the preferred form of my invention, the flow of grain to one row being planted by the drill is periodically interrupted to cause short skips in the row. The flow of grain being blocked or interrupted is accumulated and then dumped into the feed tube. In the skipped areas of the row, no plants will emerge. In the areas of the immediately following the skips; the heavier planting will cause the plants to grow much thicker and bushier than in the normally planted portion of the row and in adjoining, normally planted rows. For some reason, if a handful of grain is planted in one spot, the resulting plants will not only be more thickly associated, but will also grow taller for a period of time. This phenomenon has been utilized in the present invention. After the plants have emerged, the bunched grain and the skips will be plainly visible to an operator looking down the field. In actual practice, one such marker row is usually planted for each pass of the grain drill. The operator of the spraying equipment can usually drive right over one of the marked rows. Therefore, the sprayer operator does not have to judge the position of the end of the spray boom. As a result, very accurate spraying can be achieved, without skipping or overlapping any areas. I have found that the marker row will remain visible for up to five or six weeks. After that period of time, the grain matures such that the skips and bunches are very difficult to distinguish. However, it is during the initial period of time in which the marker row is visible that spraying operations and the like are conducted.

The present invention eliminates the need for extra men, the dropping of paper strips, and the use of powder or flour markers. In addition to being more economical than prior art systems, it is much more accurate and is easily visible to both aircraft pilots and ground operators. Because skips are avoided, random patches of weeds do not show up in the field. Such patches of weeds often cause delays in harvesting because they tangle in the reel on the combine or add undesirable moisture to the grain. When too many skips have been made, it is often necessary to leave the grain in the swath for several days of good weather to finish drying the weeds. Because the present invention enables the operator to spray the entire area of the field, such problems are avoided when it is used. Damage to the crop caused by overlapping or the spraying operation is also avoided.

BRIEF DESCRIPTION OF THE DRAWINGS

FIG 3 is a fragmentary elevational view taken generally along the line 3—3 of FIG. 1;

FIG. 4 is a sectional view taken generally along the line 4—4 of FIG. 3;

FIG. 5 is a diagrammatic view of a timing device for actuating the seed interrupter;

FIG. 6 is a schematic diagram of the circuit for operating the seed interrupter solenoid;

FIGS. 9 and 10 are plan views illustrating alternate methods of marking fields during seeding operations according to the present invention.

DESCRIPTION OF THE PREFERRED EMBODIMENTS

Figure 1:
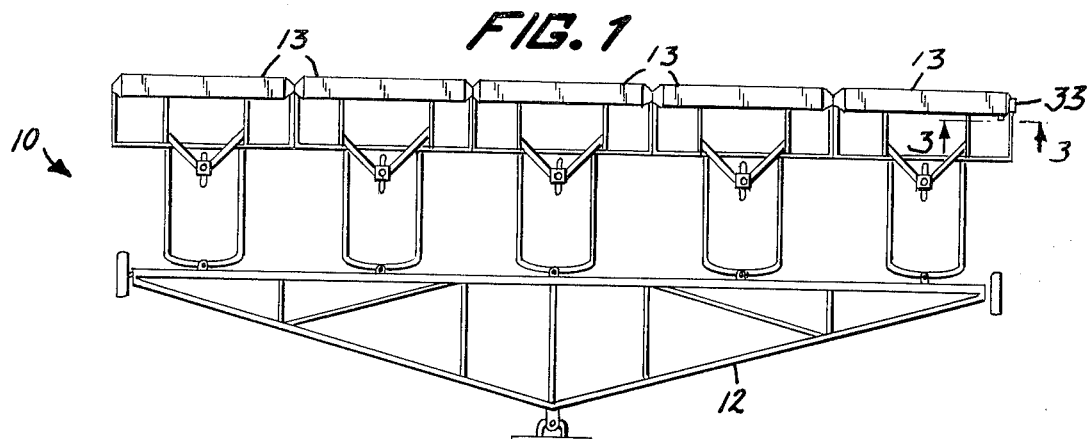
FIG. 1 is a view in top plan of a seed drill assembly and tractor incorporating the present invention.
Figure 2:
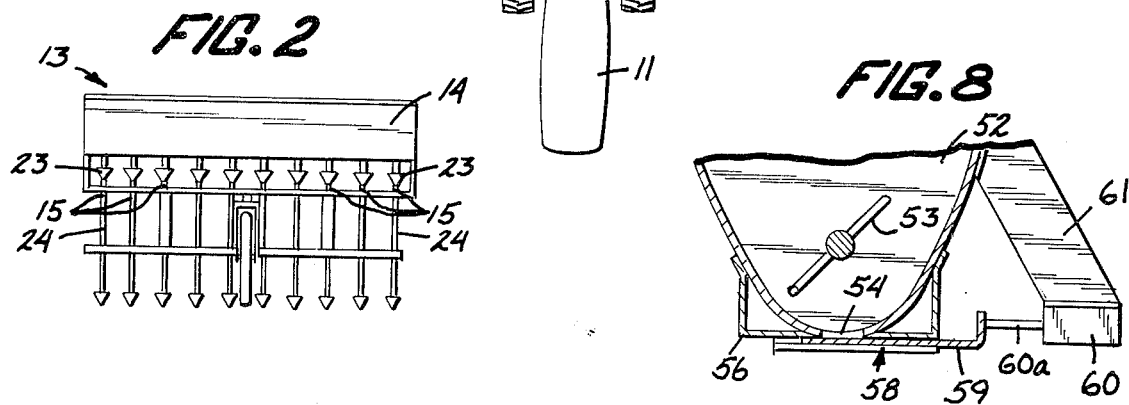
FIG. 2 is a schematic view from the rear of a single grain drill unit of FIG. 1.

A multiple grain drill assembly 10 being pulled by a tractor 11 is shown in FIG. 1. Assembly 10 includes an implement hitch 12 and five unit drills 13. As shown schematically in FIG. 2, each unit drill 13 has a grain box or hopper 14 with a plurality of seeding units 15 mounted along the length of the bottom side thereof at spaced intervals. The unit drills 13 can be standard grain drills of any known design. FIGS. 3 and 4 show the construction of each seeding unit 15 in more detail. The box 14 has a bottom wall 14a with an opening 14b therein for each seeding unit 15. Mounted below each opening 14b and forming a part of the seeding unit 15 is a metering wheel 16 mounted on a square, rotating shaft 17 and partially surrounded by a meter housing 18 with an opening 18a in the front wall thereof through which the seed is discharged by the metering wheel 16. An adjustable gate 19 is mounted in the housing 18 in front of the wheel 16. As seen in FIG. 4, the wheel 16 rotates in a clockwise direction to carry a continuous flow of grain seeds up over the adjustable gate 19 from where they drop out through the opening 18a. The seeding unit 15 also includes a funnel-like member 23 mounted below the metering means to catch the seed being discharged from the opening 18a. A flexible seeding tube 24 is connected to the downwardly facing small open end of the funnel-like member 23. As shown schematically in FIG. 2, some form of drill shoe or the like is mounted at the bottom end of the tube 24 to open a furrow in the soil into which the seeds are dropped. As the drill 13 is pulled over the ground, a traction wheel drive and suitable gearing (not shown) causes continuous rotation of shaft 17 and all of the metering wheels 16 mounted thereon. A continuous flow of seed is thus provided through each of the seeding units 15.

According to the preferred embodiment of the present invention, the flow of seed through one of the seeding units 15 is changed or regulated as compared to the even flow through the other units, in order to provide a visibly different row when the plants emerge. The seeding unit shown in FIGS. 3 and 4 is actually the outermost left-hand seeding unit of the multiple grain drill assembly 10 shown in FIG. 1. A seed interrupter plate 28 is pivotally mounted by hinge means 29 to the upper front edge of funnel-like member 23, as shown in FIG. 4. Plate 28 is designed to pivot from a rest position adjacent the inner wall of funnel-like member 23 as shown in full lines in FIG. 4, to a higher, seed blocking position within opening 18a as shown in phantom in FIG. 4. In the upper position, the seed being discharged from the metering means drops onto the plate 28 and is there accumulated. Plate 28 is provided with a pair of upstanding partial side walls 30 along opposite side edges thereof. The walls 30 prevent seeds from falling off that portion of the plate 28 which is located outside of the housing 18. When the plate 28 is moved to the lower position, the accumulated seed is dumped into the funnel-like member 23 and tube 24. A solenoid 31 is mounted on the wall of member 23 opposite plate 28. Solenoid 31 has a movable arm 31a which extends through an opening in the wall of funnel-like member 23 for connection with plate 28. When solenoid 31 is energized, arm 31a is extended to raise the plate 28 to the upper, seed blocking position. When the solenoid 31 is deenergized, the plate and the attached arm 31a drop to the seed releasing position.

A control housing 33 is secured to the outer end of the drill. Housing 33 contains a speed reducing gear 35 shown schematically in enlarged form in FIG. 5, which is driven by a gear 34 mounted on the end of shaft 17, an extension of which extends into the box 33. The reducing gear 35 has a plurality of arcuate, conductive, switch engaging members 36 mounted on one wall thereof concentric with the center of the gear. A pair of contactor switches 37, 38 are supported by means of a bracket member 39 in position to contact and complete an electrical circuit through one of the arcuate members 36. As shown schematically in the drawings, bracket 39 is provided with slotted mounting openings so that switches 37, 38 can be moved upwardly or downwardly to engage a selected one of the arcuate members 36. The arcuate members 36 are of different lengths so that the time in which the circuit is closed can be adjusted. A battery 40 is mounted on grain box 14 and is connected to ground and by a conductor 41 to switch 37. Solenoid 31 is connected between ground and switch 38 by a conductor 42. Thus, when switches 37 and 38 are contacting one of the arcuate members 36, current flows from the battery 40 through solenoid 31 to energize it and thus extend the plate 28 to the upper, seed blocking portion.

Figure 8:
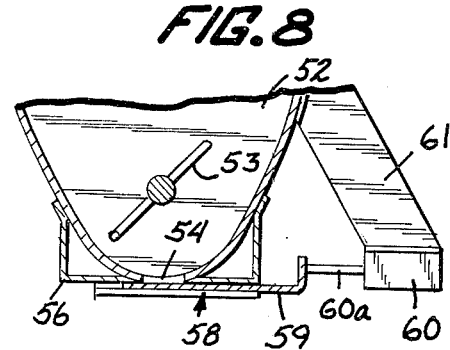
FIG. 8 is a detailed vertical sectional view of a portion of FIG. 7.
Figure 7:
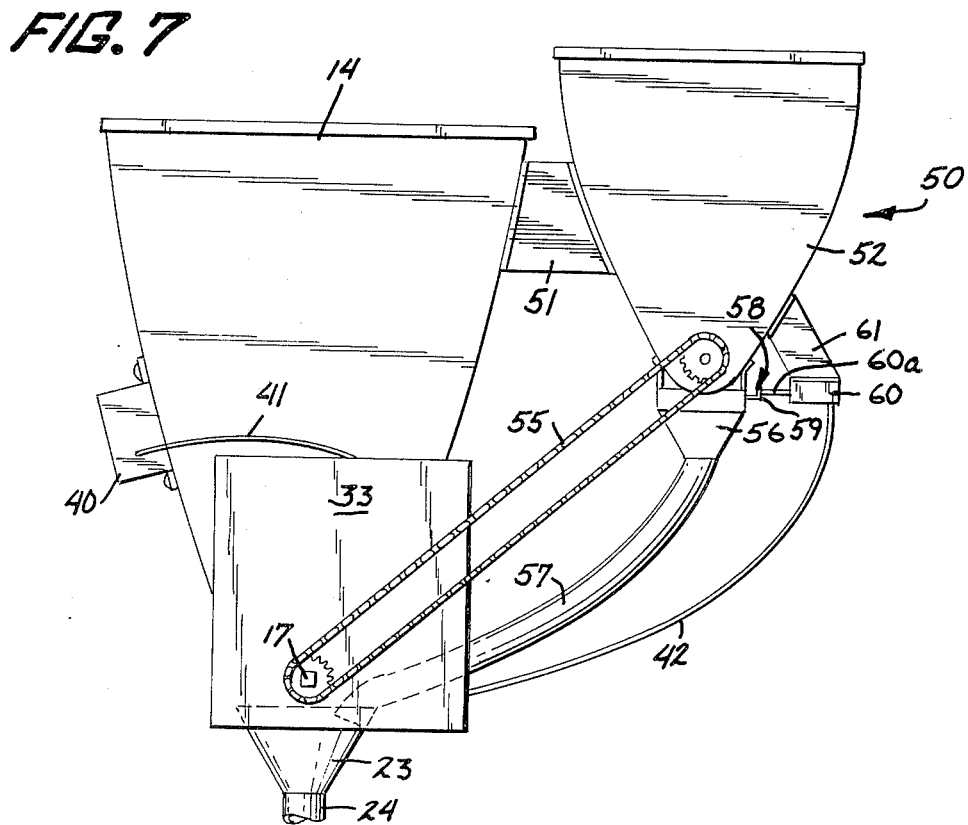
FIG. 7 is a fragmentary view in side elevation of an alternate embodiment of the invention.

FIGS. 7 and 8 disclose an alternate embodiment of the invention wherein an auxiliary unit 50 is mounted to the hopper 14 by means of a bracket 51. Auxiliary unit 50 also has a hopper 52 which is filled with the seed being planted or if desired, with some other kind of seed. A rotatable agitator device 53 is mounted within hopper 52 adjacent a bottom opening 54 thereof. Agitator device 53 is rotated by means of a drive chain 55 driven by a gear on shaft 17. Seed being discharged from opening 54 passes through a funnel member 56 and hose 57 secured below hopper 52. Hose 57 leads to the earlier described funnel-like member 23. Mounted directly below opening 54 within member 56 is a gate valve assembly 58 having a sliding plate 59 that is movable between two positions to open and close the valve. Plate 58 is attached to the movable arm 60a of a solenoid 60, which is mounted to hopper 52 by a bracket 61. In FIGS. 7 and 8, arm 60a is shown in the extended position with the plate 59 closing off the opening 54. When the solenoid 60 is deenergized, the arm 60a retracts and pulls plate 59 with it to permit a flow of grain through the tube 57. The circuit shown in FIG. 6 can also be used to control solenoid 60.

When the embodiment of FIGS. 7 and 8 is used, the row is fully planted by the standard seeding unit 15, but at periodic intervals, additional seed is dropped into the furrow by the auxiliary unit 50. This extra seed causes a thicker growth in that portion of the row which is plainly visible after the plants are a few inches high.

If another kind of seed is used, the resulting plants would appear different because of their different leaf structure or more rapid growth. As an example, the auxiliary unit 50 could be supplied with beans-maze or mile or cane. Beans are preferable because the bean plants would be destroyed by the herbicide and would not be incorporated in the grain crop at harvest time.

The mechanism of FIGS. 3 and 4 will also provide periodic thicker bunches, but the intermediate portions will include a regularly seeded portion, followed by a portion bare of seed where the feed mechanism is entirely blocked off. These skipped portions of the row followed by thicker bunches will increase the visibility of the row to the operator. In its broadest sense, the concept of the invention is to change the pattern of flow of seed through the seeding unit to provide a visible, distinctive row when the plants emerge. The mechanism of FIGS. 3 and 4 will periodically interrupt the normal seed flow, accumulate seed during, the interrupted period, and then dump the accumulated seed to cause the necessary bunching. The mechanism of FIGS. 7 and 8 does not interrupt the main flow of seed, but it does increase the amount of seed being planted at periodic intervals. Another approach to changing the pattern of flow is simply to completely block the seed flow through the one unit. The marker row would thus be entirely unplanted. However, this would be somewhat wasteful of usable acreage. Another approach would be to continuously increase to a significant degree the amount of seed flowing through one of the seeding units so that the entire row would be overplanted. This would be somewhat wasteful of seed, however.

FIG. 9 discloses one method of using the present invention in planting a field of seed grain. The multiple grain drill assembly 10 of FIG. 1 starts in the lower left-hand corner and is pulled counterclockwise around the outer edge of the field. The assembly is pulled in a spiral, counterclockwise path as shown until it reaches the center of the field. As the grain drill assembly is pulled around the field, the flow of seed through the seeding unit 15 on the left end is periodically interrupted to bunch the seeds at periodic intervals along the inside edge of the area being planted during that pass. Let us assume that instead of using five drill units 13 as shown in FIG. 1, three such units, each fourteen feet wide, are hooked together as shown. During each pass of the assembly, a strip forty-two feet wide will be planted. The marker row will be along the inside edge of this planted strip on each pass. At spraying time, a sprayer eighty-four feet wide should be used, which is twice the width of the grain drill assembly. The operator should then start spraying at the same corner in which the seeding started, and the tractor should straddle the marker row labeled number one in FIG. 9. In this way, forty-two feet of the boom is spraying the outside drill round or pass, and the inside forty-two feet of the boom is spraying the second drill round or pass. The operator need not be concerned with the ends of the boom, but needs only to watch the marker row. When the first round of spraying has been completed, two drill rounds will have been covered, and on the next pass the operator should follow the marker row numbered three in FIG. 9. It can be seen that the best results will be obtained if the sprayer width is an equal number multiple of the drill width. In this way, the operator can follow one of the marked rows without being concerned with the position of the boom ends. By carefully following the marked row with the tractor, the operator completely avoids any skipping or overlapping between passes.

In FIG. 10, the field is being planted by making parallel passes of the grain drill assembly over the field, as shown. Assuming the marking device is at the left-hand end of the unit, the marker row number one would be planted twice, once on the first pass to the right and then again on the second pass to the left. The double marking could be avoided by deenergizing the solenoid completely during the second pass. The same procedure could be followed in planting the remainder of the field. Once again, the sprayer that is later used should be either twice or four times the width of the grain drill assembly so that the operator can follow the appropriate ones of the marked rows 1, 2, 3, etc. of FIG. 10.

In the embodiment shown in the drawings, I have disclosed for timing purposes, a speed reducing gear carrying arcuate conductive members that are wiped once each revolution by a pair of contactor switches. Another approach to timing the energization of the solenoid 31 is to use the acre tally that is standard equipment on many drills. The acre tally has a readout dial showing the number of acres planted. It is driven by a shaft which is suitably geared to the shaft 17. Typically, the acre tally shaft rotates once for each one-tenth acre that is planted. To attach a cam to the end of the acre tally shaft, and position a switch to be closed by the cam once per revolution of the tally shaft. The switch actuates, either directly or through a relay, the solenoid 31. Using a drill fourteen feet wide, and assuming the cam closes the switch after each one-tenth acre of planting, the row would be marked approximately every 214 feet. If closer marking were desired, a cam having two or more lobes could be used so that the switch would be closed more than once per revolution.

The present invention provides means for planting, on any selected pass over the field, at least one row of seed in a pattern different from the other rows to provide a visible, distinctive marker row when the plants emerge. In the embodiments shown, the marker row is at one end of the grain drill. However, depending upon the type of equipment being used, and the desired position of the marker row, it might be planted by some intermediate seeding unit of the drill.

What is claimed is:

1. A method of so marking a field in which seed is planted in closely spaced rows as to provide visible marking for spraying or the like after plants have emerged, comprising the steps of planting seeds in the field in rows with a standard drill having a plurality of closely spaced seeding units by making passes over the field with the drill in a predetermined pattern, and simultaneously planting, during at least selected passes over the field, spaced portions of one row of seed with increased amounts of seed sufficient to establish thicker growth in said portions of said row to provide a visible, distinctive repetitive, and uneven growth pattern in said one row when the plants emerge.

2. A method of marking a field in which seed is planted in closely spaced rows which are normally difficult to visually follow when the plants emerge, in order to provide visible markings for spraying or the like after the plants have emerged, comprising the steps of:
   a. planting the field with a seeder having a plurality of closely spaced seeding units; and
   b. repetitively changing the flow of seed through one of said units sufficiently to establish, in the marker row planted by said one unit, a cyclically uneven growth pattern as compared to the rows planted by the remaining units, to provide a visible and distinctive marker row when the plants emerge.

3. The method of claim 2 wherein the flow of seed is changed by periodically increasing the amount of seed planted in a row to produce repetitively a densely planted row portion which yields an area of thick plant growth different from other portions of said row.

4. The method of claim 2 wherein the flow of seed is changed by periodically interrupting the normal flow of seed planted to produce repetitively an unplanted row portion.

5. The method of claim 2 wherein the flow of seed is changed by periodically interrupting the normal flow of seed planted in a row and subsequently increasing the amount of seed planted to produce repetitively an unplanted row portion followed by a densely planted row portion which yields thicker plant growth.

6. The method of claim 2 wherein the flow of seed is changed by periodically adding a flow of different seed to the seed being planted, to produce a row having repeated portions exhibiting the growth of visually different plants.

7. A method of growing grain or the like in a field in which seed is planted in closely spaced rows which are normally difficult for a treating equipment operator to visually follow when the plants emerge, comprising the steps of:

a. planting the field by making successive, non-overlapping passes over the field with a seeding device having a plurality of closely spaced seeding units;

b. cyclically controlling the flow of seed through one of said units to establish, in a marker row associated with said one unit, a different, cyclical, and uneven planting pattern as compared to the rows planted by the remaining units, to provide a visible and distinctive marker row when the plants emerge; and c. treating the emerged plants with suitable treating equipment as by spraying or the like, by making passes over the field following at least selected marker rows in the field, whereby treatment skips and overlapping are minimized.

8. The method of marking a grain field at seeding so as to facilitate the later performance of agricultural operations on the growing crops which comprises cyclically and unevenly modifying the seeding along the lengths of predetermined rows of the field so that upon emergence the plants in said predetermined rows exhibit a cyclic growth pattern which is visually distinguishable from the overall pattern in the field.

* * * * *